United States Patent
Koll

(10) Patent No.: US 9,027,448 B2
(45) Date of Patent: May 12, 2015

(54) METHOD FOR REDUCING THE ECCENTRICITY OF THE INNER AND OUTER SURFACE OF A HOLLOW WORKPIECE ROTATABLY CLAMPED IN A MACHINE TOOL

(75) Inventor: Reinhard Koll, Linz (AT)

(73) Assignee: WFL Millturn Technologies GmbH & Co. KG, Linz (AT)

( * ) Notice: Subject to any disclaimer, the term of this patent is extended or adjusted under 35 U.S.C. 154(b) by 108 days.

(21) Appl. No.: 13/981,982

(22) PCT Filed: Jan. 27, 2012

(86) PCT No.: PCT/AT2012/050013
§ 371 (c)(1),
(2), (4) Date: Aug. 23, 2013

(87) PCT Pub. No.: WO2012/100278
PCT Pub. Date: Aug. 2, 2012

(65) Prior Publication Data
US 2013/0333531 A1 Dec. 19, 2013

(30) Foreign Application Priority Data
Jan. 28, 2011 (AT) .................................. A 121/2011

(51) Int. Cl.
*B23B 5/40* (2006.01)
*G05B 19/18* (2006.01)
*B23B 5/06* (2006.01)

(52) U.S. Cl.
CPC .............. *G05B 19/18* (2013.01); *G05B 19/182* (2013.01)

(58) Field of Classification Search
USPC ................................ 82/1.11, 1.2, 47, 48, 118
See application file for complete search history.

(56) References Cited

U.S. PATENT DOCUMENTS

| | | | | |
|---|---|---|---|---|
| 2,357,094 A * | 8/1944 | Edgar | ........................... | 409/244 |
| 4,620,463 A | 11/1986 | Horn et al. | | |
| 5,168,609 A | 12/1992 | Kojima et al. | | |
| 5,894,771 A * | 4/1999 | Braun et al. | ...................... | 82/47 |
| 7,614,326 B2 * | 11/2009 | Peltonen et al. | ............... | 82/1.11 |
| 8,146,464 B2 * | 4/2012 | Oiwa | ............................ | 82/1.11 |

(Continued)

FOREIGN PATENT DOCUMENTS

| | | |
|---|---|---|
| CA | 1 301 494 C | 5/1992 |
| DE | 196 20 516 A1 | 11/1997 |

(Continued)

OTHER PUBLICATIONS

International Search Report of PCT/AT2012/050013, dated Jun. 1, 2012.

*Primary Examiner* — Will Fridie, Jr.
(74) *Attorney, Agent, or Firm* — Collard & Roe, P.C.

(57) ABSTRACT

The invention relates a method for reducing the eccentricity of the inner and outer surface (7, 9) of a hollow workpiece (i), for example a hollow shaft, rotatably clamped in machine tool (2), in which in one clamping a plurality of measurement data depending on the contour of the inner surface (7) of the hollow workpiece (i) are recorded, for example with the aid of ultrasound, using the recorded measurement data a desired surface (13) is calculated for at least a part of the outer surface (9), which has a reduced eccentricity with respect to the inner surface (7) and in a further step the rotating workpiece (i) is at least partially machined at the outer surface (9) thereof according to the desired surface (13).

6 Claims, 4 Drawing Sheets

(56) References Cited

U.S. PATENT DOCUMENTS

2009/0156097 A1* 6/2009 Pilkington .................. 451/5
2013/0333531 A1* 12/2013 Koll .............................. 82/1.11

FOREIGN PATENT DOCUMENTS

DE         199 58 373 A1     6/2001
WO       WO 0076721 A1 * 12/2000

* cited by examiner

METHOD FOR REDUCING THE ECCENTRICITY OF THE INNER AND OUTER SURFACE OF A HOLLOW WORKPIECE ROTATABLY CLAMPED IN A MACHINE TOOL

CROSS REFERENCE TO RELATED APPLICATIONS

This application is the National Stage of PCT/AT2012/050013 filed on Jan. 27, 2012, which claims priority under 35 U.S.C. §119 of Austrian Application No. A 121/2011 filed on Jan. 28, 2011, the disclosure of which is incorporated by reference. The international application under PCT article 21(2) was not published in English.

TECHNICAL FIELD

The invention relates to a method for reducing the eccentricity of the inner surface relative to the outer surface of a hollow work piece rotatably clamped into a machine tool, for example of a hollow shaft, in which method multiple measurement data dependent on the contour of the inner surface of the hollow work piece are recorded in one clamped position, for example using ultrasound, a reference surface for at least a part of the outer surface having a reduced eccentricity relative to the inner surface is calculated using the recorded measurement data, and, in a further step, the rotating work piece is machined, at least partially in chip-removing manner, on its outer surface, in accordance with the reference surface.

STATE OF THE ART

In order to reduce imbalance in the case of hollow work pieces, methods are known from the state of the art in which the degree of concentricity between the inner surface and the outer surface can be increased. In this connection, it is also known (DE 19958373A1) to clamp a hollow work piece in place in rotatable manner and to record multiple measurement data dependent on the progression or the contour of the inner surface of the hollow work piece in this clamped position. Using these coordinates of measurement points, obtained by way of an ultrasound measurement, a reference progression of the outer surface or a reference outer surface is calculated, according to which the outer surface of the work piece is lathed away, in chip-removing manner—specifically in the same clamped position as during the measurement. In this way, the progression of the outer surface of the work piece can be configured parallel to the inner surface, or the eccentricity of the inner surface relative to the outer surface can be improved. A disadvantage of this method is the comparatively great measurement, calculation, and control effort. Thus, first a sizable number of measurement data must be recorded, which must subsequently also be processed, in order to be able to image a precise reference outer surface of the hollow work piece by means of calculations. Machining of the hollow work piece, in the next step, furthermore requires comparatively great control effort, because the entire hollow work piece is lathed away in regulating manner. Such methods are therefore not only complicated but also slow, which in turn opposes precise chip-removing machining, for example with optimal cutting data with regard to the tool used; comparatively great surface quality cannot be guaranteed in this way. However, a reduction in the number of recorded measurement data to accelerate the method can lead to a significant loss in precision in the machining of the work piece, so that no improvements of the method are possible in this way, either. Furthermore, there is the fact that operating errors during the selection of the number of measurement points can have a significant influence on the quality of the method result. Such methods therefore cannot machine high-quality work pieces satisfactorily, because such methods are comparatively prone to error, slow, and difficult to operate.

PRESENTATION OF THE INVENTION

The invention has therefore set itself the task of improving a method of the type described initially, in such a manner that not only can a comparatively high degree of concentricity of inner and outer surface be achieved with it, but also, at the same time, precise chip-removing machining of the outer surface of the work piece becomes possible with it. Furthermore, the method is supposed to be fast and easy to operate.

The invention accomplishes the stated task in that at least one partial surface corresponding to the calculated reference surface is produced on the outer surface of the work piece, using chip-removing machining, and that the work piece is newly clamped using at least the produced partial surface, by way of clamping means, for example a clamping chuck and/or steady rest, after which, in this new clamped position, at least the remaining outer surface of the rotating work piece is machined in chip-removing manner, at least in part, in order to thereby at least partially reduce the eccentricity of the inner surface relative to the outer surface.

If at least a partial surface on the outer surface of the work piece is produced in accordance with the calculated reference surface, using chip-removing machining, and if the work piece is newly clamped, using at least the produced partial surface, then the work piece can be prepared for precise further machining with comparatively simple and fast method steps. This is because this small partial surface, as compared with the total outer surface, can be adapted fairly quickly to the inner surface of the cavity of the work piece, in terms of concentricity, so that a surface can be produced on the work piece, without special measures, which surface can be suitable for new and precise clamping. Advantageously, the expanse of the partial surface on the work piece must be taken into consideration in accordance with the requirements of the clamping means. In the new clamped position, these clamping means can then be provided with simple handling steps, in order to thereby orient the axis of symmetry of the inner surface particularly precisely relative to the axis of rotation of the machine tool or to be able to bring these two axes into precise agreement. In this way, in this new clamped position, extremely precise rotational guidance of the work piece can also be made possible, which can represent an excellent starting basis for reducing the eccentricity of the inner surface relative to the outer surface, using chip-removing machining. For this purpose, now at least the remaining outer surface of the rotating work piece must be machined in chip-removing manner, at least in part, only in this new clamped position. Such a clamped position can be created, for example, using a clamping chuck or a supportive and/or clamping steady rest. Because no correction controls of the guidance of the tool with regard to a reduction in eccentricity of the inner surface relative to the outer surface have to be undertaken in the new clamped position, either, the method according to the invention is also particularly fast. In contrast to the state of the art, therefore no negative influence on the quality of the chip-removing machining of the outer surface, for example during advancing and/or in the cutting speed, has to be accepted, either, and this can always guarantee precise chip-removing machining, even if the eccentricity of the inner surface relative to the outer surface is reduced at the same time, in this way. This is essentially due to the fact that the tool can also be used with optimal cutting data and is not impaired by guidance parameters that are known from the state of the art and change constantly, as compared to the imbalanced work piece. For example, great demands with regard to the surface quality can be satisfied in this way. Furthermore, a method that is easy to operate can be created by means of simple handling steps during the preparation of the new clamped position.

The degree of concentricity of the inner and outer surface can be clearly improved if the partial surface is rotationally milled. This is because a chip-removing tool can be guided particularly precisely with reference to the eccentricity of the outer surface, balancing it out, in order to thereby make available a surface for a precise new clamped position. Aside from improved method results by means of reduced eccentricity of the inner surface relative to the outer surface, the method step for application of the partial surface can furthermore be clearly accelerated using rotational milling. The method can thereby not only become more precise, but also can proceed more rapidly. Axis-parallel rotational milling has particularly distinguished itself for creation of the partial surface.

The imbalance of the hollow work piece can be further reduced if the outer surface is machined in chip-removing manner by means of straight lathing, at least in part, in the new clamped position. In particular, longitudinal straight lathing can prove to be advantageous.

If the work piece is newly clamped, for the new clamped position, by way of the inner surface and by way of the produced partial surface, the method can be further simplified in that an already existing surface is used—namely the inner surface for the new clamped position. Furthermore, clamping by way of the inner surface, which after all represents a reference surface for shaping of the outer surface, can thereby be used for the new clamped position, without thereby having to accept a loss in precision. Therefore, an increase in the precision of the method can be created simultaneously with a reduction in the operating effort.

With regard to a further reduction in the operating effort as well as a further increase in precision, it can furthermore prove to be advantageous if the inner surface is internally clamped, particularly by way of a clamping mandrel, and supported on its produced partial surface by way of a steady rest.

If a first partial surface is applied, in chip-removing manner, at the clamping chuck and a second partial surface is applied at the opposite work piece end, which is supported in this region by a steady rest, for example, it can be made possible to reduce an imbalance of long hollow work pieces. The two partial surfaces can specifically be produced with the greatest precision, because of their comparatively close clamping means, so that a particularly high degree of concentricity of partial surface and inner surface can be made possible. By way of these special partial surfaces, the entire eccentricity of the inner surface relative to the entire outer surface can also be clearly improved, if the hollow work piece is clamped by the clamping chuck with a partial surface, for the new clamped position, and the other partial surface is supported by a steady rest and subsequently machined further.

BRIEF DESCRIPTION OF THE DRAWING

The method according to the invention is explained in greater detail in the figures, as an example. The figures show.

METHOD FOR IMPLEMENTATION OF THE INVENTION

Figure 1:
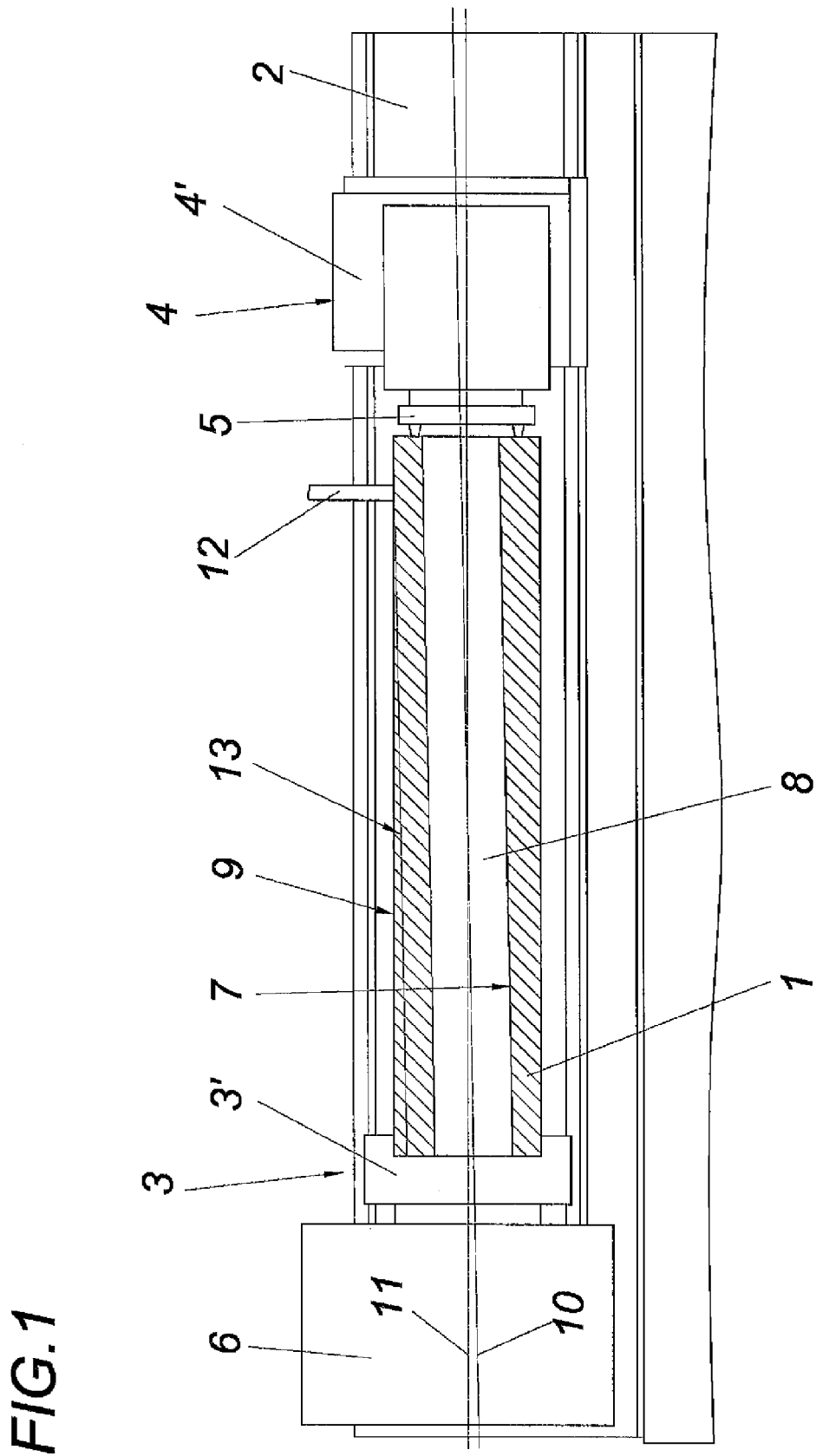
FIG. 1 a front view of a hollow work piece clamped into a machine tool,
FIG. 2 a machining view of the work piece clamped in according to FIG. 1,
FIG. 3 a front view of the work piece according to FIG. 2 in a new clamped position,
FIG. 4 a broken front view of the work piece clamped in according to FIG. 3, during machining with regard to a reduction of the eccentricity of the inner surface relative to the outer surface,
FIG. 5 a sectional view of an alternative clamped position according to FIG. 3.
Figure 2:
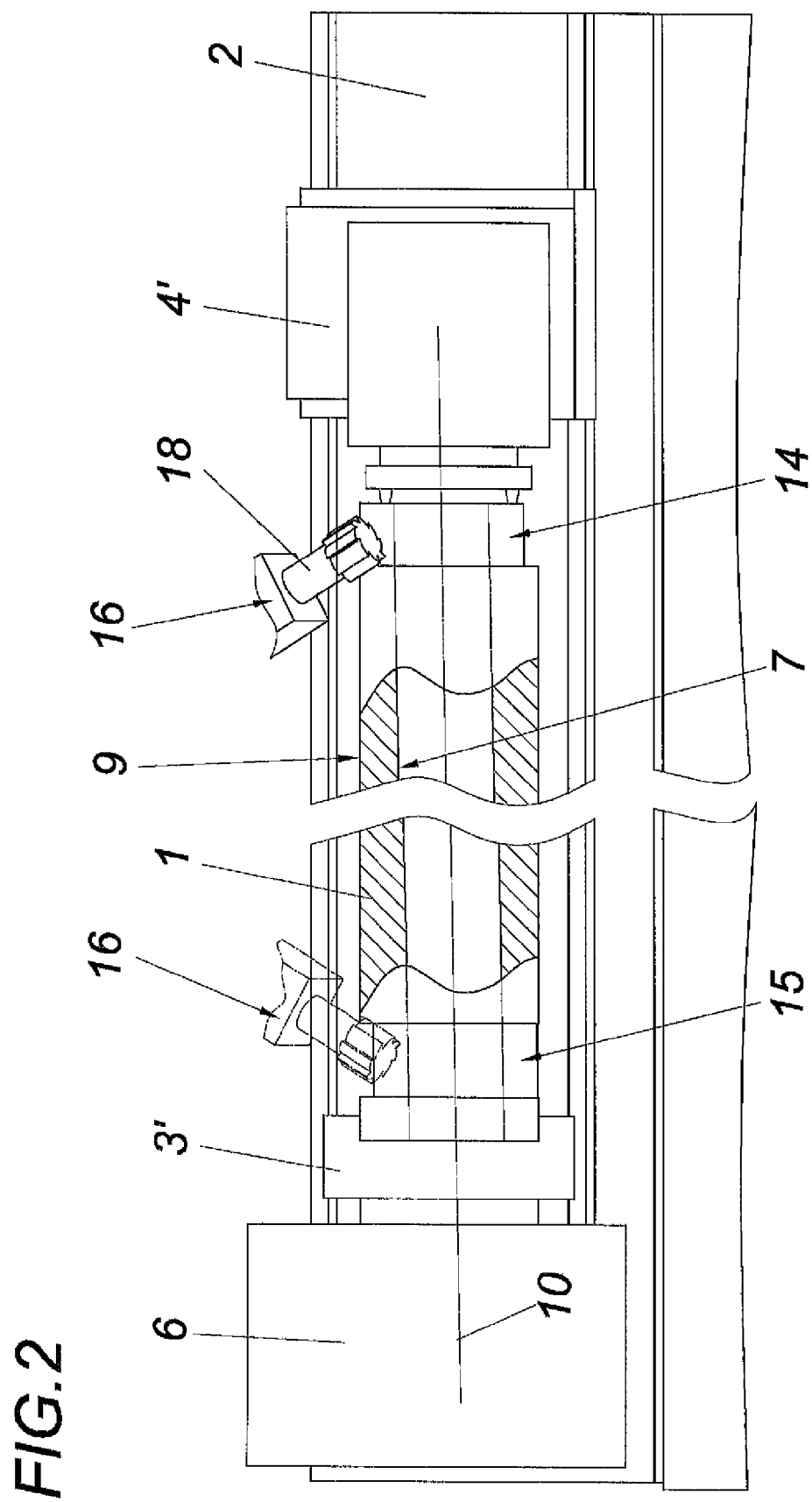
Figure 3:
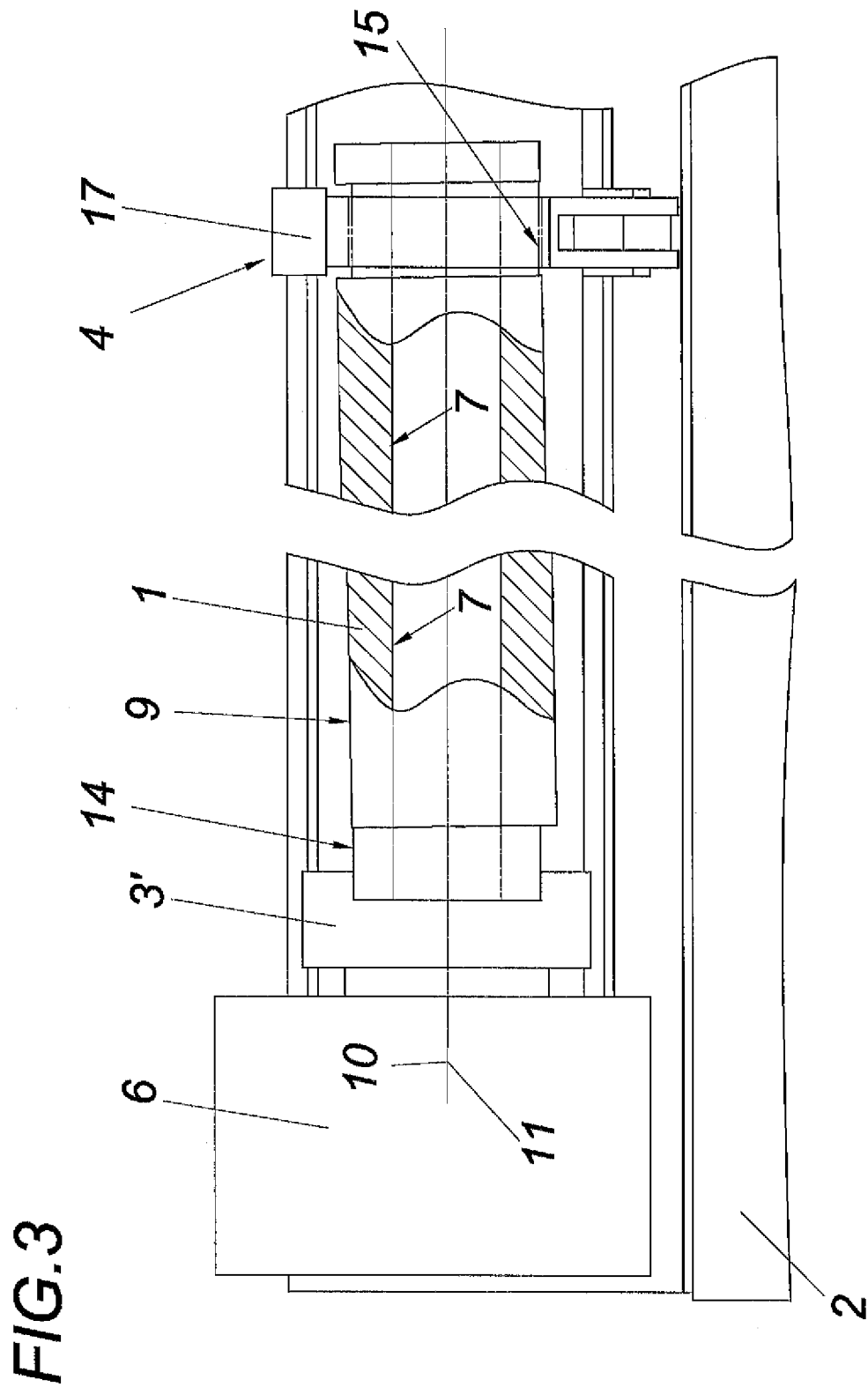

The method according to the invention is described in greater detail according to FIGS. 1 to 4, as an example. According to FIG. 1, a hollow work piece 1, for example a hollow shaft, is shown in section, which work piece 1 is clamped in a machine tool 2. For this purpose, two clamping means 3 and 4 engage on the work piece 1, namely a clamping chuck 3' that clamps on the outside on one side, and a tailstock 4' on the opposite side, which clamps the face side of the work piece 1 with centering tips 5. The clamping chuck 3' is connected with a spindle drive 6 so that the work piece 1 can be clamped in rotatable manner. As can be seen in FIG. 1, an eccentricity exists between the inner surface 7 of the cavity 8 and the outer surface 9, as can be recognized on the basis of the angle position of the axis of symmetry 10 of the inner surface 7 and of the axis of rotation 11 of the machine tool 2. In order to determine the eccentricity of the inner surface relative to the outer surface 7 and 9, respectively, the wall thickness of the work piece 1 is measured using an ultrasound measurement device 12, specifically at different locations in the circumference direction or preferably also in the longitudinal direction of the work piece 1. In this clamped position, multiple measurement data dependent on the contour of the inner surface 7 of the hollow work piece 1 are therefore recorded. Using the recorded measurement data, a reference surface 13 having a reduced eccentricity relative to the inner surface 7 is now calculated for at least a part of the outer surface 9. In order to allow a particularly fast and stable method, only two partial surfaces 14, 15 are produced on the outer surface 9 of the work piece 1, in accordance with the calculated reference surface 13, using chip-removing machining. For machining, at least one tool 16 is used. In contrast to the state of the art, the outer surface 9 is therefore not completely machined in chip-removing manner, in accordance with the reference surface, but only partially. The partial surfaces 14, 15 that are produced are used to newly clamp the work piece 1. As can be seen in FIG. 3, the work piece 1 is clamped in the clamping chuck 3' with its first partial surface 14 and supported by a steady rest 17 as a further clamping means 4 on its second partial surface 15. It does not need to be specifically mentioned that other surfaces can also be used for the new clamped position. In this new clamped position, the axis of symmetry 10 of the inner surface 7 and the axis of rotation 11 of the machine tool 2 can now be brought into the same position. Without special further measures, the remaining outer surface 9 of the rotating work piece can now be machined in chip-removing manner, as can be derived from FIG. 4. The outer surface 9 can thereby be finished in accordance with the reference surface 13, without the reference surface 13 having to be calculated for the entire outer surface 9. For this reason, no great control effort is required for the tool 16, either, which simplifies the method.

The eccentricity of the inner surface relative to the outer surface 7 relative to 9 can thereby be quickly reduced. In contrast to the state of the art, the method allows great machining speed, so that comparatively high surface quality can also be achieved.

The partial surfaces 14 and 15 according to FIG. 2 are rotationally milled using a tool 16 configured as a milling cutter 18, whereby preferably, axis-parallel rotational milling is carried out, which can produce partial surfaces 14 and 15 that are for example concentric to the corresponding inner surface 7.

Figure 4:
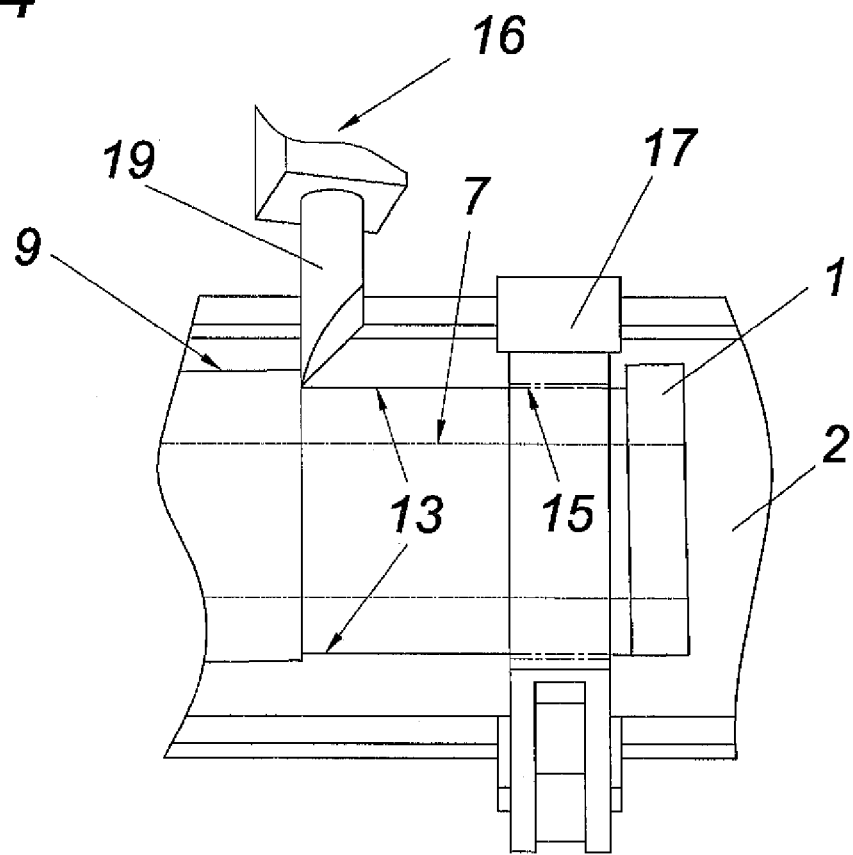

According to FIG. 4, in a new clamped position the outer surface 9 is machined in chip-removing manner, by means of straight lathing, using a rotary chisel 19. In particular, longitudinal straight lathing is used for precise method results.

Figure 5:
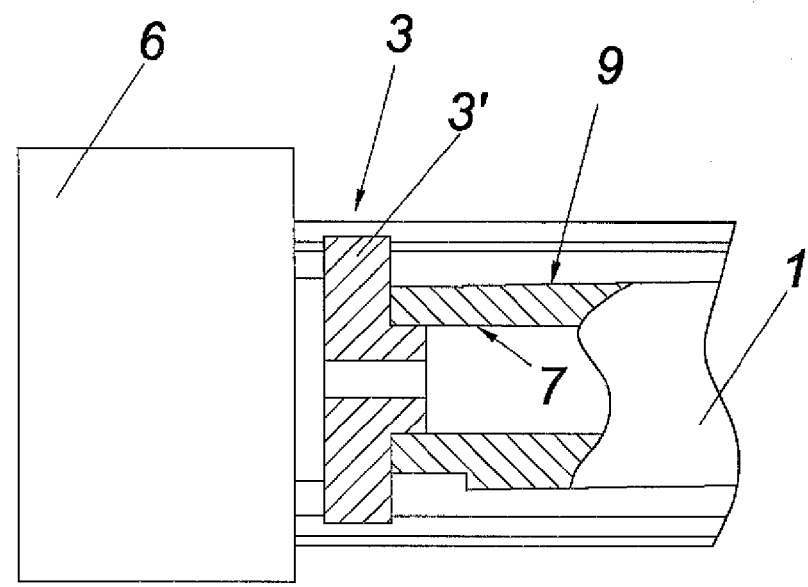

According to FIG. 5, it is shown that a different surface other than the partial surfaces 14, 15 on the work piece 1 can also be used for the new clamped position. Specifically, the inner surface 7 can also be used for this purpose, in order to newly clamp the work piece 1 precisely using the partial surfaces 14 and 15. This can be done, for example, by way of a clamping mandrel not shown in any detail, or also by way of stepped jaws of the clamping chuck 3. The second support or the second bearing can be formed by a steady rest not shown in any detail according to FIG. 5, which engages on one of the produced partial surfaces 14 or 15.

It does not need to be specifically mentioned that the partial surfaces 14, 15 are shown as examples. As needed, one partial surface or multiple partial surfaces can be provided on the work piece 1, whereby any position on the work piece 1 is possible.

The invention claimed is:

1. Method for reducing the eccentricity of the inner surface relative to the outer surface (7, 9) of a hollow work piece (1) rotatably clamped into a machine tool (2), for example of a hollow shaft, in which method multiple measurement data dependent on the contour of the inner surface (7) of the hollow work piece (1) are recorded in one clamped position, for example using ultrasound, a reference surface (13) for at least a part of the outer surface (9) having a reduced eccentricity relative to the inner surface (7) is calculated using the recorded measurement data, and, in a further step, the rotating work piece (1) is machined, at least partially in chip-removing manner, on its outer surface (9), in accordance with the reference surface (13), wherein at least one partial surface (14, 15) corresponding to the calculated reference surface (13) is produced on the outer surface (9) of the work piece (1), using chip-removing machining, and wherein the work piece (1) is newly clamped using at least the produced partial surface (14, 15), by way of clamping means (3, 4), for example a clamping chuck (3') and/or steady rest (17), after which, in this new clamped position, at least the remaining outer surface (9) of the rotating work piece (1) is machined in chip-removing manner, at least in part, in order to thereby at least partially reduce the eccentricity of the inner surface relative to the outer surface (7, 9).

2. Method according to claim 1, wherein the partial surface (14, 15) is for example rotationally milled in axis-parallel manner.

3. Method according to claim 1 wherein in the new clamped position, the outer surface (9) is machined in chip-removing manner, at least in part, by means of straight lathing, for example by means of longitudinal straight lathing.

4. Method according to claim 1, wherein in the new clamped position, the hollow work piece (1) is newly clamped by way of its inner surface (7) and by way of the produced partial surface (14, 15).

5. Method according to claim 4, wherein the inner surface (7) is clamped on the inside by way of a clamping mandrel, for example, and supported on its produced partial surface (14 or 15) by way of a steady rest (17).

6. Method according to claim 1, wherein a first partial surface (15) is applied to the work piece (1), in chip-removing manner, at the clamping chuck of the clamped position, and a second partial surface (14) is applied at the opposite work piece end, which is supported in this region by a steady rest (17), for example, after which the hollow work piece (1) is clamped by the clamping chuck (3) for the new clamped position, at least with its second partial surface (14), and supported by a steady rest (17) with its first partial surface (15).

* * * * *